(12) United States Patent
Cocker et al.

(10) Patent No.: US 9,517,890 B2
(45) Date of Patent: Dec. 13, 2016

(54) RETRACT TO LOAD LOG STEP FEEDER

(71) Applicant: LAR-CO SALES LTD., Prince George (CA)

(72) Inventors: William Charles Cocker, Prince George (CA); Garry Charles Larsen, Summit Lake (CA)

(73) Assignee: LAR-CO SALES LTD., Prince George (CA)

( * ) Notice: Subject to any disclaimer, the term of this patent is extended or adjusted under 35 U.S.C. 154(b) by 0 days.

(21) Appl. No.: 14/611,009

(22) Filed: Jan. 30, 2015

(65) Prior Publication Data

US 2016/0221760 A1 Aug. 4, 2016

(51) Int. Cl.
| B65G 25/08 | (2006.01) |
| B65G 25/04 | (2006.01) |
| B65G 25/00 | (2006.01) |

(52) U.S. Cl.
CPC ....... *B65G 25/08* (2013.01); *B65G 2201/0282* (2013.01)

(58) Field of Classification Search
None
See application file for complete search history.

(56) References Cited

U.S. PATENT DOCUMENTS

| 3,265,195 A * | 8/1966 | Ford ..................... B65G 25/08 198/773 |
| 5,351,729 A | 10/1994 | Brisson |
| 5,385,227 A * | 1/1995 | Marsh ................ B65G 47/1471 198/773 |
| 5,423,417 A | 6/1995 | Redekop |
| 5,653,570 A | 8/1997 | Weirathmueller |
| 5,678,681 A * | 10/1997 | Klockars ................ B65G 25/04 198/459.3 |
| 6,761,261 B2 | 7/2004 | Dussault et al. |
| 6,779,648 B2 * | 8/2004 | Woodham ................ B07C 5/14 198/463.1 |
| 6,779,649 B2 * | 8/2004 | Woodham ............. B65G 25/08 198/459.5 |
| 8,413,795 B2 | 4/2013 | Petryshen |
| 2002/0005331 A1 | 1/2002 | Dussault |

FOREIGN PATENT DOCUMENTS

| CA | 2768173 | 8/2012 |
| CH | 663404 | 12/1987 |
| EP | 1000700 | 5/2000 |
| NZ | 19950280496 | 9/1997 |

* cited by examiner

*Primary Examiner* — Kavel Singh
(74) *Attorney, Agent, or Firm* — Richard D. Okimaw

(57) ABSTRACT

An apparatus for singulating logs comprises a stationary support at least one inclined stationary surface and a top edge and a first reciprocating support having a top step positioned against the inclined stationary surface. The first reciprocating support is movable between a bottommost position wherein the top step is positioned below the top edge of the stationary support and a topmost position wherein the top step is positioned above the top edge of the stationary support. The apparatus further comprises a plurality of fingers extending from the top step wherein each of the fingers has a length adapted to regain a log on the top step at a topmost position of the first reciprocating support and to retract into the stationary support at the bottommost position of the first reciprocating support.

17 Claims, 8 Drawing Sheets

RETRACT TO LOAD LOG STEP FEEDER

BACKGROUND OF THE INVENTION

1. Field of Invention

The present invention relates to log feeders in general and in particular a method and apparatus for singulating logs with a step log feeder having reduced starting power requirements and improve feed speeds.

2. Description of Related Art

In the field of lumber production logs are frequently introduced into a sawmill in a grouping which must first be separated from each other to feed into a conveyor belt entering the mill. One common apparatus for accomplishing this separation or singulating as it is referred to in the art is a step feeder. As illustrated in FIG. 1, a step feeder 10 commonly includes two moving members connected by a common driven linkage having inclined steps that feed logs up to a fixed incline surface at the top such that the reciprocating movement of one of the moving members advances each log up the inclined slope of the step feeder one inclined step at a time and over the fixed incline surface at the exit of the step feeder.

A common difficulty with conventional step feeders occurs when an operator pauses the step feeder to permit a preceding log to be advanced out of the way of the exit to the step feeder. With conventional step feeders, as the log will be dropped onto an awaiting conveyor belt at the topmost position of the moving member, the operator is required to stop the step feeder part way through the lifting portion of the reciprocating motion of the step feeder with the moving member part way up the incline plate surface at the exit of the step feeder so as to prevent the log from being inadvertently discharged from the step feeder. Such positioning of the log therefore requires that in order to restart the step feeder, the log must be lifted from a resting position while the step feeder comes up to operating speed. As this is part way through the lifting portion of the lift and retract reciprocating motion of the step feeder, more power is required to start from this position and it takes more time to complete the cycle to feed the log and go back to the bottom to retrieve another log.

SUMMARY OF THE INVENTION

According to a first embodiment of the present invention, there is disclosed an apparatus for singulating logs comprising a stationary support at least one inclined stationary surface and a top edge and a first reciprocating support having a top step positioned against the inclined stationary surface. The first reciprocating support is movable between a bottommost position wherein the top step is positioned below the top edge of the stationary support and a topmost position wherein the top step is positioned above the top edge of the stationary support. The apparatus further comprises a plurality of fingers extending from the top step wherein each of the fingers has a length adapted to regain a log on the top step at a topmost position of the first reciprocating support and to retract into the stationary support at the bottommost position of the first reciprocating support.

The stationary support may include a plurality of slots adapted to receive the fingers therein. The stationary support may be formed of a plurality of segments having gaps therebetween defining the slots.

The first reciprocating support may comprise a plurality of plates extending perpendicular from the at least one inclined stationary surface. The plurality of plates may be located within slots in the at least one inclined stationary surface.

The apparatus may further comprise a second reciprocating support having a plurality of secondary inclined reciprocating steps having a spacing therebetween corresponding to the inclined reciprocating steps wherein the second moveable support is reciprocating relative and opposite to the first reciprocating support so as to position each step above a corresponding inclined moving step of the first reciprocating member at a topmost position thereof and below the next lower reciprocating step at a bottommost position thereof.

The second reciprocating support may comprise a plurality of plates extending perpendicular from the at least one inclined stationary surface. The plurality of secondary plates may be located within slots in the at least one inclined stationary surface.

The stationary support may include a plurality of inclined stationary steps wherein the first reciprocating support includes a plurality of inclined reciprocating steps each corresponding to a stationary step of the stationary support, wherein each reciprocating step is positioned above its corresponding stationary step at the topmost position wherein each reciprocating step is positioned below a stationary step below its corresponding stationary step at the bottommost potion.

The fingers may be permanently formed with the top step. The fingers may be fastened to the top step. The fingers may have a top support surface angled away from the top step. The top support surface may be angle between 25 and 75 degrees from vertical. The top edge may be positioned towards the top step side of the center of gravity of a log supported on the top step and fingers at the topmost position thereof. The top edge may include rear angled surface away from the top edge. The rear surface may be angled between 25 and 75 degrees from vertical.

According to a first embodiment of the present invention, there is disclosed an method for singulating logs comprising resting a log against a stationary support having at least one inclined stationary surface and a top edge and lifting the log utilizing a first reciprocating support having a top step positioned against the inclined stationary surface, wherein the first reciprocating support is reciprocating between a bottommost position wherein the top step is positioned below the top edge of the stationary support and a topmost position wherein the top step is positioned above the top edge of the stationary support. The method further comprises supporting the log above the top edge between the top step and a plurality of fingers extending from the top step wherein each of the fingers has a length adapted to regain a log on the top step at a topmost position of the first reciprocating support and to retract into the stationary support at the bottommost position of the first reciprocating support and retracting the first reciprocating support so as to retract the fingers into the stationary support thereby depositing the log to a rear of the top edge.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
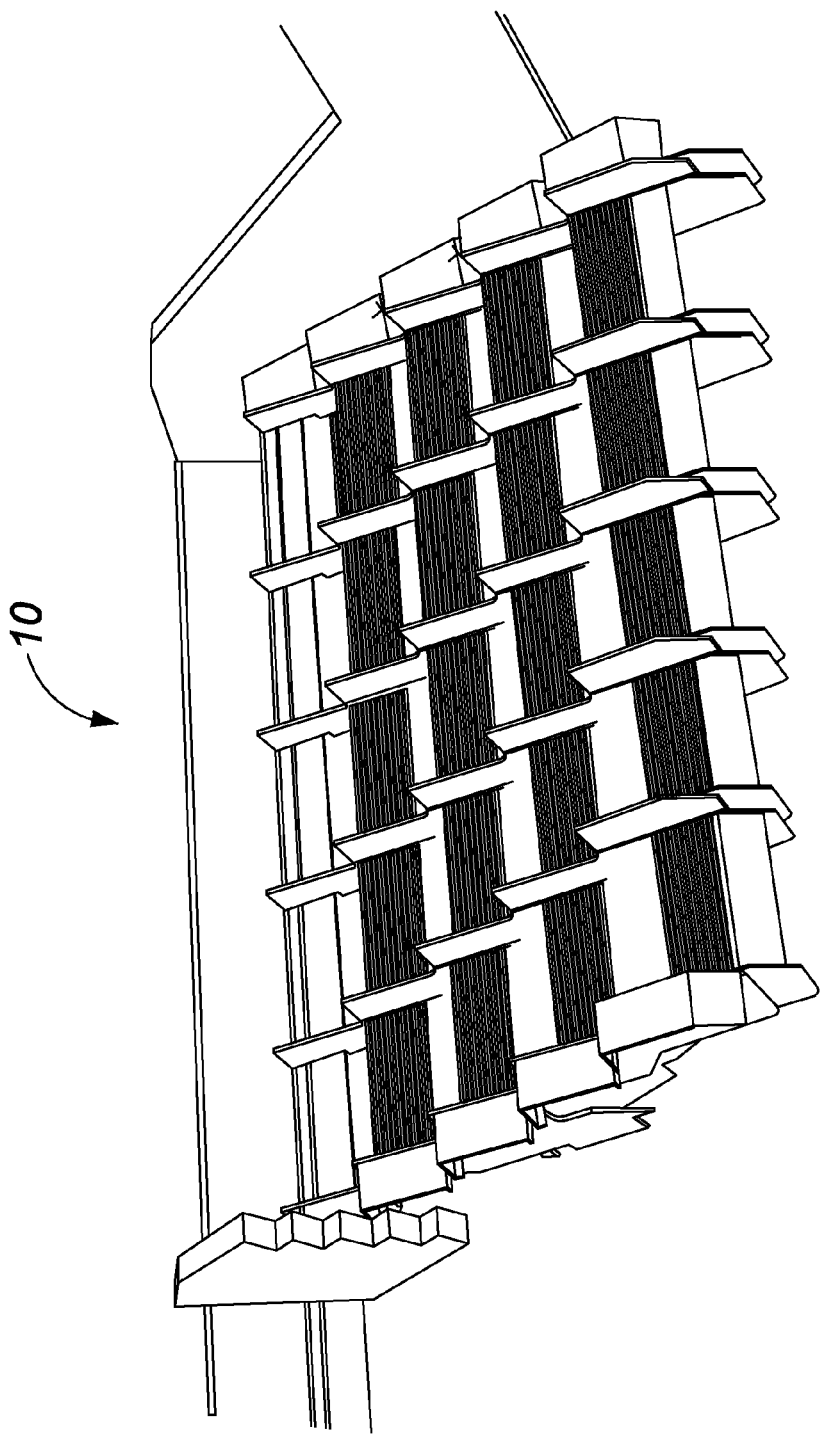
FIG. 1 is a perspective view of a prior art log step feeder.
Figure 2:
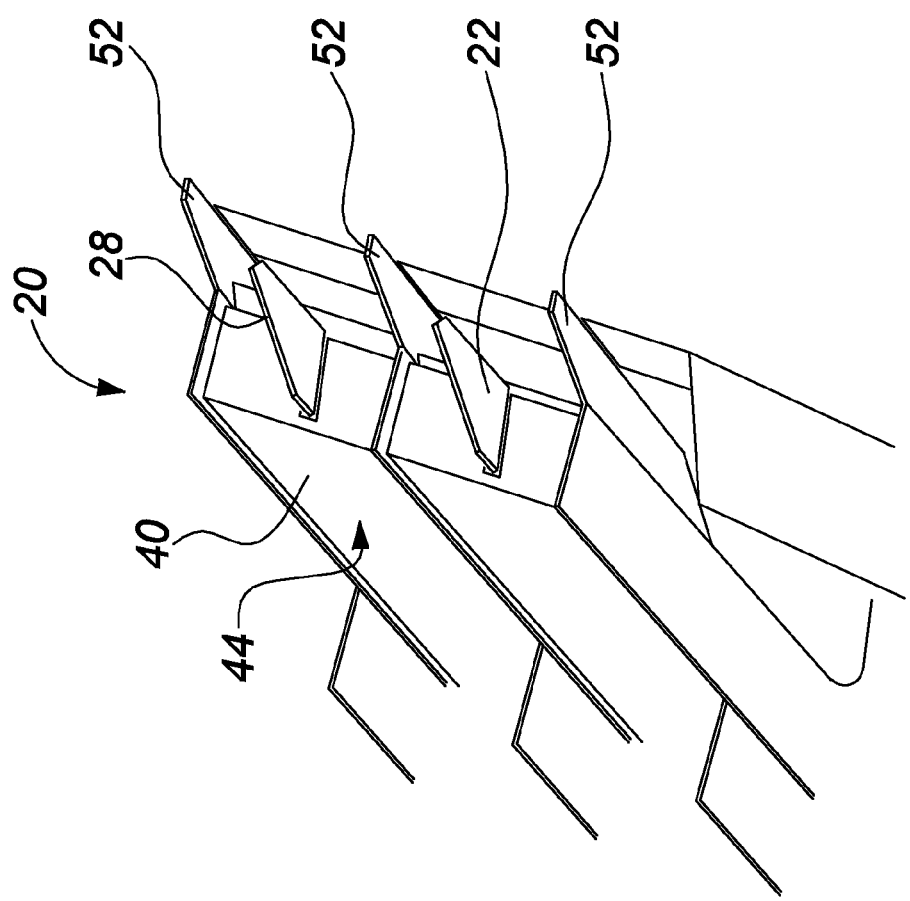
FIG. 2 is a perspective view of a log step feeder according to a first embodiment of the present invention.

Referring to FIG. 1, an apparatus for singulating logs according to a first embodiment of the invention is shown generally at 20. The apparatus 20 comprises a stationary support member 22 and a first reciprocating member 40 adapted to alternating advance one log at a time towards a top edge of the stationary support member. The first reciprocating member 40 includes a plurality of fingers 52 adapted to support a log at a topmost position thereof and to retract into the stationary support member 22 at a bottommost position thereof as will be more fully described below.

Figure 3:
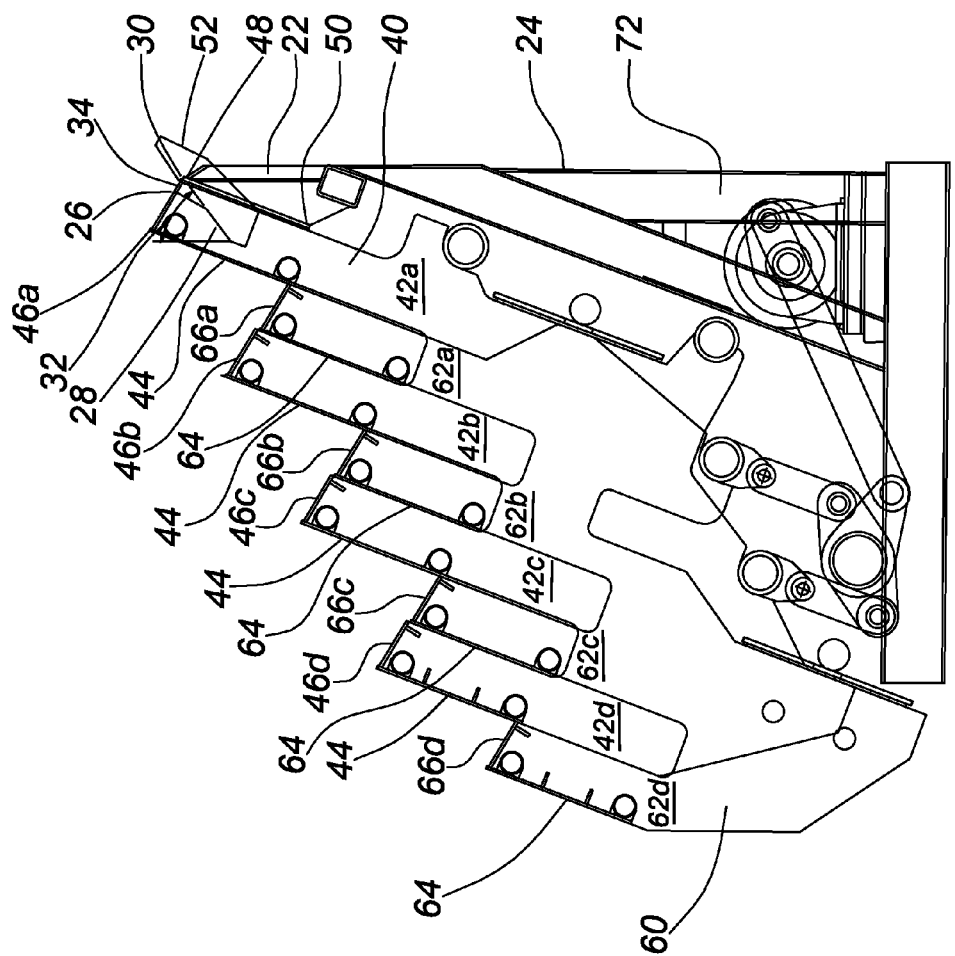
FIG. 3 is a side view of the apparatus of FIG. 3.

With reference to FIG. 3, the stationary support member 22 comprises a frame 24 adapted to support the remainder of the components of the apparatus as is commonly known. The stationary support member includes a top edge 26 having an inclined support surface 28 extending from the front thereof and a rear surface 30 extending to the rear thereof. The inclined support surface 28 is angled from vertical by an inclination angle generally indicated at 32 which may be selected to be between 25 and 75 degrees. The rear surface 28 is angled from vertical by an inclination angle generally indicated at 34 which may be selected to be between 25 and 75 degrees.

Figure 8:
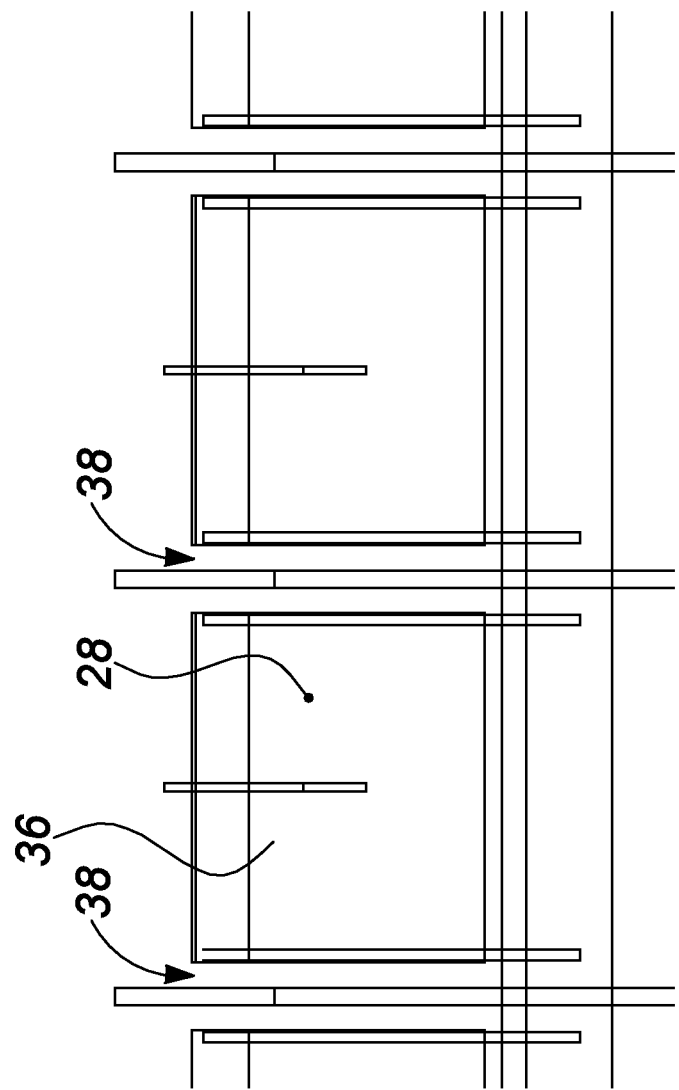
FIG. 8 is a detailed front view of top end of the apparatus of FIG. 3

As illustrated in FIG. 8, the inclined support surface 28 is formed of a plurality of plate sections 36 having gaps or spaces 38 therebetween. As illustrated the plates 36 of the first reciprocating member are located within the gaps 38 as will be more fully described below. The width of each plate 36 and therefore the distance between the gaps 38 and plates 36 of the first reciprocating member 40 is selected to provide adequate support to the logs that are intended to be lifted and singulated such as, by way of non-limiting example, between 6 and 30 inches (152 and 762 mm). Similarly, the width of each gap 38 will be selected to receive the plates 36 with an adequate spacing therebetween to accommodate bark and other loose material without binding such as, by way of non-limiting example, between 1 and 3 inches (25 and 76 mm).

With reference back to FIGS. 3 and 4, the first reciprocating member 40 comprises an inclined member having a plurality of steps 42a, 42b, 42c and 42d and a vertical face 44 extending therebetween. Each of the steps has a generally upwardly oriented surface 46a, 46b, 46c and 46d which is inclined towards the vertical face 44. The first reciprocating member 40 extends between top and bottom ends, 48 and 50, respectively wherein the top end 48 includes a plurality of fingers 52 extending therefrom. As illustrated the fingers 52 are positioned to be located within the gaps of the inclined support surface 30 so as to be retracted therein at the bottommost position of the first reciprocating member 40. Each of the steps 42a through 42d has a spacing therebetween adapted to advance a log by a corresponding distance over the stroke of the first reciprocating member as is commonly known. Each upwardly oriented surface 46 also has a length selected to receive and support a log thereon such as, by way of non-limiting example, between 4 and 20 inches (102 and 508 mm).

The apparatus may also include a second reciprocating member comprising an inclined member having a plurality of steps 62a, 62b, 62c and 62d and a vertical face 64 extending therebetween. Each of the steps has a generally upwardly oriented surface 66a, 66b, 66c and 46d which is inclined towards the vertical face 64. The second reciprocating member 60 extends between top and bottom ends, 68 and 70. The steps 62a through 62d may have spacing therebetween and depths corresponding to the spacing and depths of the steps of the first reciprocating member. As is commonly known in the art the first and second reciprocating members advance a log up the apparatus by reciprocatingly moving the first and second reciprocating members in opposite direction to each other. At the bottommost position of the first reciprocating member, the each step of the first reciprocating member will be located below its corresponding step of the second reciprocating member wherein the second reciprocating member is at the topmost position. At the topmost position of the first reciprocating member, the each step of the first reciprocating member will be located above a step above its corresponding step of the second reciprocating member wherein the second reciprocating member is at the bottommost position. By way of non-limiting example at the topmost position of the first reciprocating member, step 42c will be above step 62b wherein at the bottom most position of the first reciprocating member, step 42c will be below step 62c. The apparatus may also include one or more drives 72 to reciprocatingly move the first and second reciprocating members 40 and 60.

Figure 5:
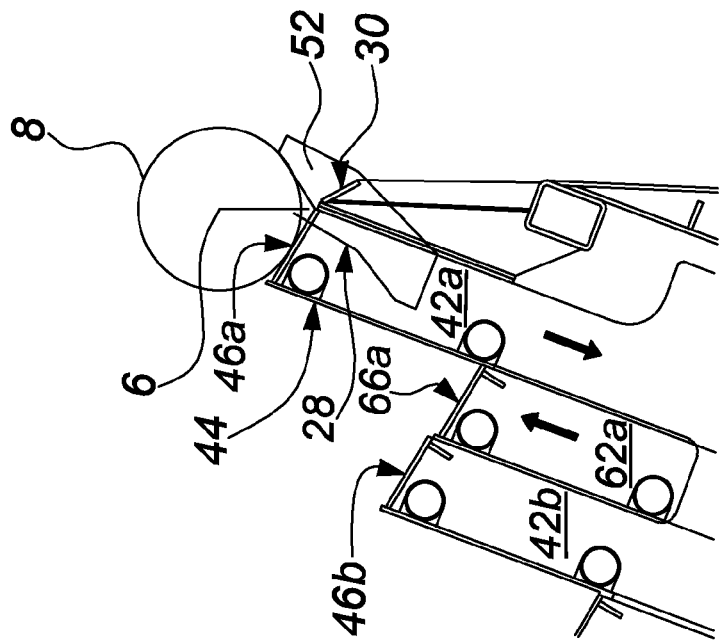
FIG. 5 is a detailed side view of the top end of the apparatus of FIG. 3 at a second or topmost position.
Figure 4:
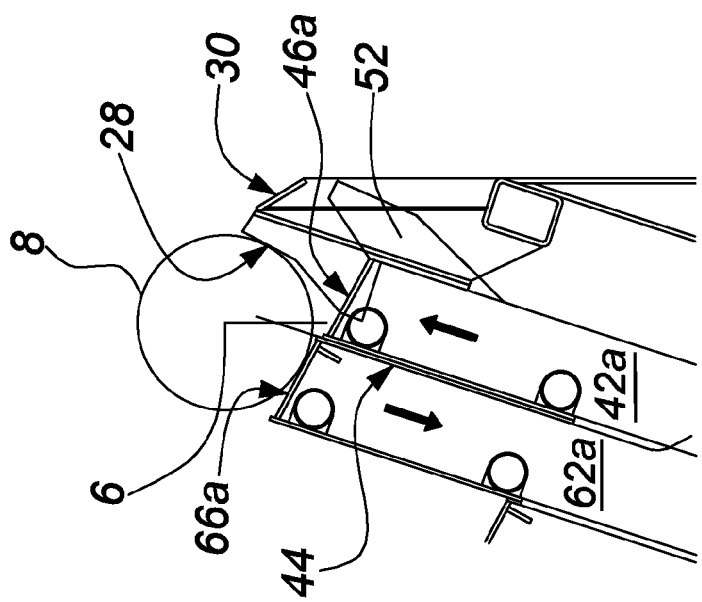
FIG. 4 is a detailed side view of the top end of the apparatus of FIG. 3 at a first or bottommost position.
Figure 7:
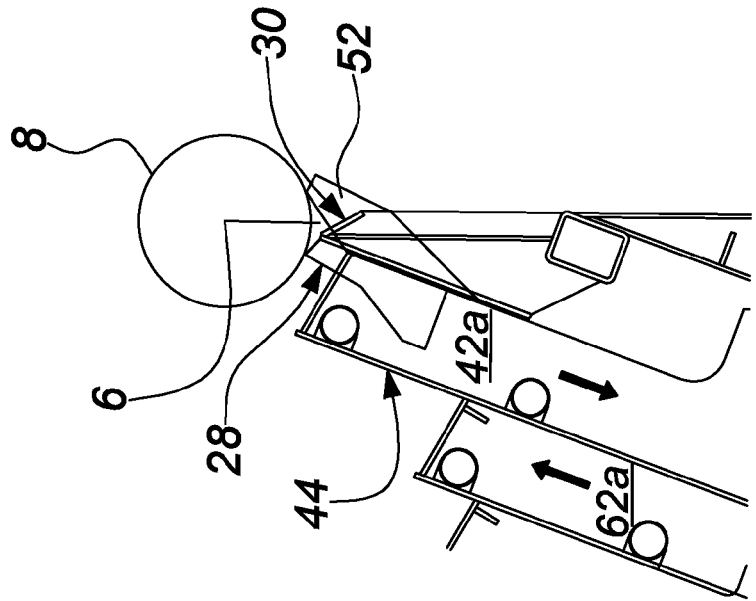
FIG. 7 is a detailed side view of the top end of the apparatus of FIG. 3 at a release position.
Figure 6:
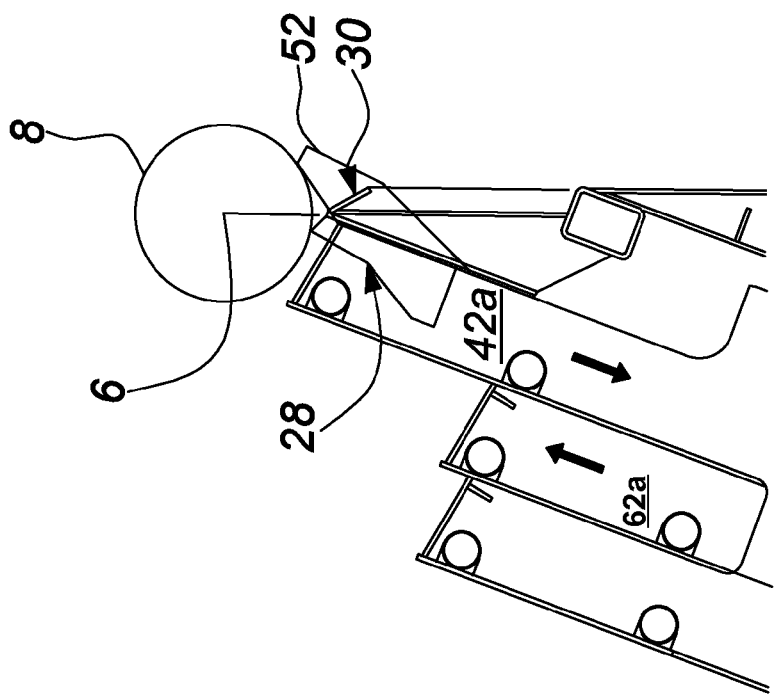
FIG. 6 is a detailed side view of the top end of the apparatus of FIG. 3 at a retracting position.

With reference to FIGS. 4 through 7, in operation top step once a log 8 is located upon the top step 62a of the second reciprocating member, the log will be supported between the upwardly oriented surface 66a and the inclined support surface 28 as illustrated in FIG. 4. As the first reciprocating member 40 is moved upward, the fingers 52 will be extended from between the gaps 38 to engage upon and support the log to a position above the top edge 30 of the stationary support at the topmost position as illustrated in FIG. 5. The operator may then stop the apparatus at the topmost position to await a room on the conveyor belt downstream of the apparatus or may continue the operation of the apparatus to drop the log. As illustrated in FIGS. 6 and 7, as the first reciprocating member 40 is lowered from the topmost position, the fingers 52 are retracted into the gaps 38 so as to engage the log upon the top edge 26. In particular the center of gravity 6 of the log is positioned toward the rear of the stationary support 22 such that continued movement downward of the first reciprocating member permits the log 8 to roll down the rear surface 30 thereby discharging the log 8 onto a conveyor belt or other device below the apparatus.

The steps of the first and second reciprocating members may be formed of plates adapted to fit within the gaps 38 however it will also be appreciated that the steps may also be formed of horizontally extending plates or the like.

Figure 10:
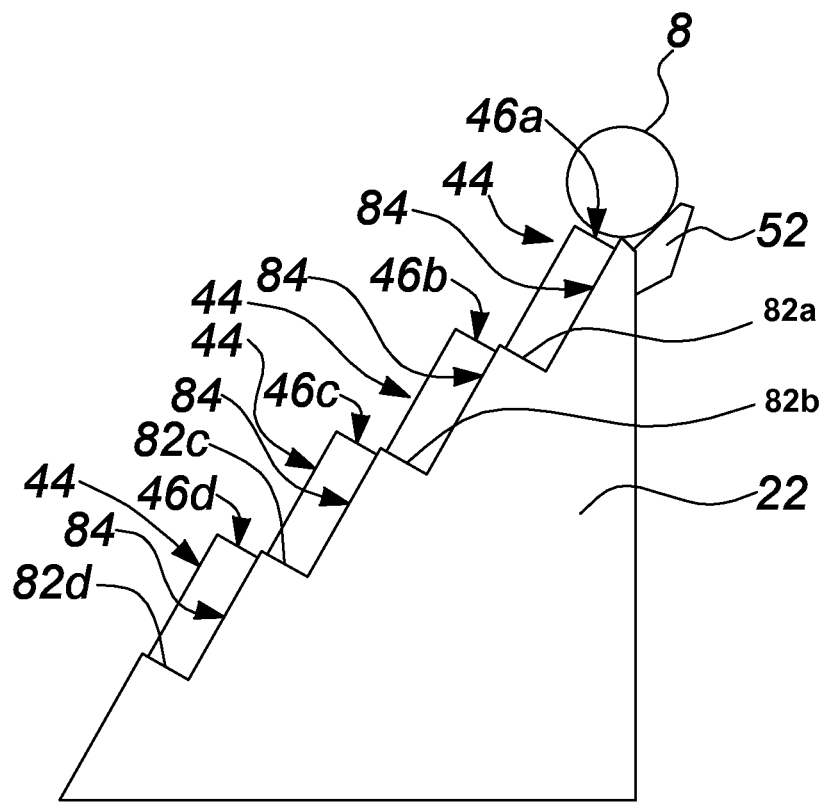
FIG. 10 is a side view of a log step feeder according to a further embodiment of the present invention having a single reciprocating member.

Although the apparatus described above includes first and second reciprocating 40 and 60, the apparatus may also be formed with a single reciprocating member as illustrated in FIG. 10. In such embodiments, the stationary support 22 may comprise an inclined member having a plurality of steps 82a, 82b, 82c and 82d and a vertical face 84 extending therebetween. Each of the steps has a generally upwardly oriented surface 86a, 86b, 86c and 86d which is inclined towards the vertical face 84.

Figure 9:
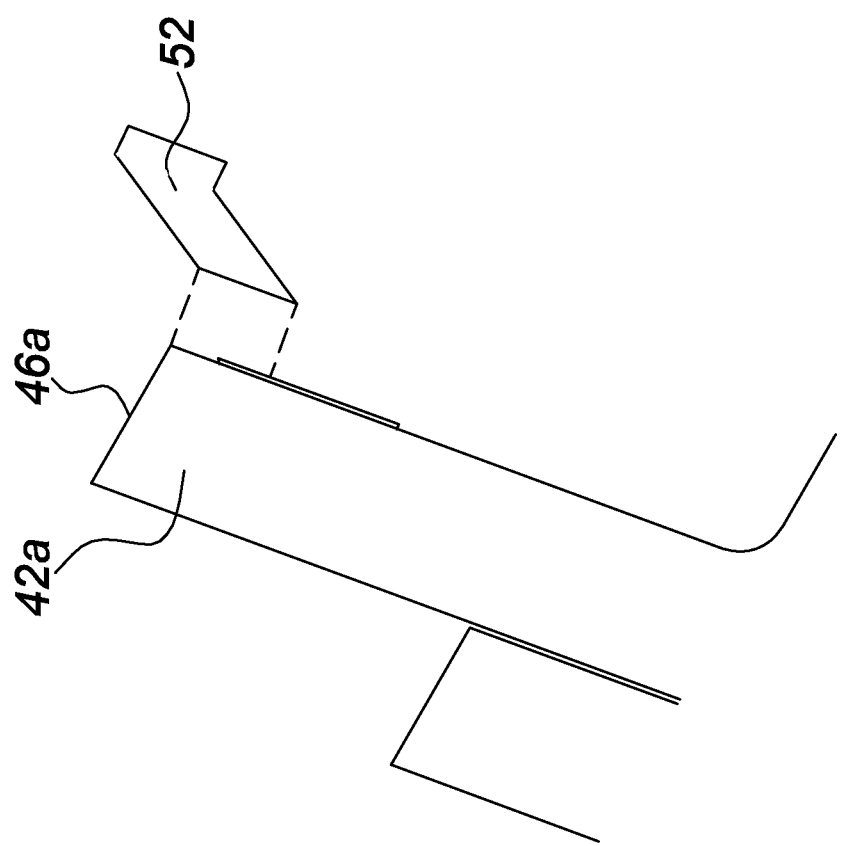
FIG. 9 is a detailed exploded view of the reciprocating member of the apparatus of FIG. 3 illustrating the assembly of the fingers thereto.

It will be appreciated that the fingers 52 may be co-formed with the first reciprocating member 40. Optionally the fingers 52 may be securable thereto so as to permit retrofitting of existing step feeders as illustrated in FIG. 9.

The finger may be secured thereto with fasteners, such as bolts or screws by way of non-limiting example or may be permanently fastened through welding or the like.

While specific embodiments of the invention have been described and illustrated, such embodiments should be considered illustrative of the invention only and not as limiting the invention as construed in accordance with the accompanying claims.

What is claimed is:

1. An apparatus for singulating logs comprising:
   a stationary support having an entrance and an exit side at least one inclined stationary surface extending from said entrance side and a top edge between said entrance and exit sides;
   a first reciprocating support having a top step positioned against said inclined stationary surface, wherein said first reciprocating support is movable along a linear reciprocating path between a bottommost position wherein said top step is positioned below said top edge of said stationary support and a topmost position wherein said top step is positioned above said top edge of said stationary support; and
   a plurality of fingers extending from said top step wherein each of said fingers has a length adapted to retain a log on said top step at a topmost position of said first reciprocating support at a position above said top step in a direction towards said exit side of said stationary support therefrom and to retract into said stationary support at said bottommost position of said first reciprocating support so as to discharge said log to said exit side of said stationary support.

2. The apparatus of claim 1 wherein said stationary support includes a plurality of slots adapted to receive said fingers therein.

3. The apparatus of claim 2 wherein said stationary support is formed of a plurality of segments having gaps therebetween defining said slots.

4. The apparatus of claim 1 wherein said first reciprocating support comprises a plurality of plates extending perpendicular from said at least one inclined stationary surface.

5. The apparatus of claim 4 wherein said plurality of plates are located within slots in said at least one inclined stationary surface.

6. The apparatus of claim 1 further comprising a second reciprocating support having a plurality of secondary inclined reciprocating steps having a spacing therebetween corresponding to said inclined reciprocating steps wherein said second moveable support is reciprocating relative and opposite to said first reciprocating support so as to position each step above a corresponding inclined moving step of said first reciprocating member at a topmost position thereof and below the next lower reciprocating step at a bottommost position thereof.

7. The apparatus of claim 6 wherein said second reciprocating support comprises a plurality of plates extending perpendicular from said at least one inclined stationary surface.

8. The apparatus of claim 7 wherein said plurality of secondary plates are located within slots in said at least one inclined stationary surface.

9. The apparatus of claim 1 wherein said stationary support includes a plurality of inclined stationary steps wherein said first reciprocating support includes a plurality of inclined reciprocating steps each corresponding to a stationary step of said stationary support, wherein each reciprocating step is positioned above its corresponding stationary step at said topmost position wherein each reciprocating step is positioned below a stationary step below its corresponding stationary step at said bottommost potion.

10. The apparatus of claim 1 wherein said fingers are permanently formed with said top step.

11. The apparatus of claim 1 wherein said fingers are fastened to said top step.

12. The apparatus of claim 1 wherein said fingers have a top support surface angled away from said top step.

13. The apparatus of claim 12 wherein said top support surface is angle between 15 and 80 degrees from vertical.

14. The apparatus of claim 1 wherein said top edge is positioned towards the top step side of the center of gravity of a log supported on said top step and fingers at said topmost position thereof.

15. The apparatus of claim 14 wherein said top edge includes rear angled surface away from said top edge.

16. The apparatus of claim 15 wherein said rear surface is angled between 15 and 80 degrees from vertical.

17. A method for singulating logs comprising:
   resting a log against a stationary support having an entrance and an exit side, at least one inclined stationary surface extending from said entrance side and a top edge between said entrance and exit sides;
   lifting said log utilizing a first reciprocating support having a top step positioned against said inclined stationary surface, wherein said first reciprocating support is reciprocatingly movable along a linear path between a bottommost position wherein said top step is positioned below said top edge of said stationary support and a topmost position wherein said top step is positioned above said top edge of said stationary support along a linear reciprocating path;
   supporting said log above said top edge between said top step and a plurality of fingers extending from said top step wherein each of said fingers has a length adapted to retain a log on said top step at a topmost position of said first reciprocating support at a position above said top edge in a direction towards said exit side of said stationary support therefrom and to retract into said stationary support at said bottommost position of said first reciprocating support; and
   retracting said first reciprocating support so as to retract said fingers into said stationary support so as to discharge said log to said exit side of said stationary support thereby depositing said log to a rear of said top edge.

* * * * *